United States Patent [19]
Kock

[11] 3,753,509
[45] Aug. 21, 1973

[54] BOTTLE UNCASER-SINGLE LINER

[75] Inventor: Ronald W. Kock, Jackson, Tenn.

[73] Assignee: The Procter & Gamble Company, Cincinnati, Ohio

[22] Filed: Apr. 16, 1971

[21] Appl. No.: 134,597

[52] U.S. Cl. ............... 214/309, 214/1 BV, 198/24, 198/32
[51] Int. Cl. ............................................. B65b 21/04
[58] Field of Search ................. 214/309, 180, 1 BV, 214/6 FS, 6 M, 6 A, 301, 307, 308, 1 R

[56] References Cited
UNITED STATES PATENTS
3,178,041   4/1965   Wheat .............................. 214/6 FS Primary Examiner—Robert J. Spar
Attorney—John V. Gorman and Richard C. Witte

[57] ABSTRACT

A machine having an unloading device integrated with a single lining device. The unloading device reciprocates vertically and rotates in a vertical plane to remove containers such as bottles from reshipper cases. It grips the bases of the inverted containers, lifts them vertically from a case and simultaneously rotates to invert and move the gripped containers to a deposit station, whereat the containers are lowered and released between parallel plates which move the containers a row at a time to a conveyor which carries the containers to other operating stations.

7 Claims, 10 Drawing Figures

INVENTOR.
Ronald W. Kock

PATENTED AUG 21 1973 3,753,509

INVENTOR.
Ronald W. Kock

BY

*[signature]*

ATTORNEY

BOTTLE UNCASER-SINGLE LINER

FIELD OF THE INVENTION

This invention relates generally to case unloaders, and more particularly concerns an apparatus for unloading a plurality of light-weight, flexible containers, such as blow molded plastic bottles, from a case to a conveyor which feeds the containers in a single line to filling, capping, labelling, or other processing stations.

DESCRIPTION OF THE PRIOR ART

Current practice in the field of uncasing light weight, flexible containers from reshipper cases is to manually or automatically invert the case and vibrate the containers out of their cells so that the containers fall upright onto a horizontal "dump table." The containers are arranged in orderly rows on the "dump table" and single lined from there. This practice does not allow positive control of each individual container after it has been dropped onto the dump table, thereby the containers are unstable and can tip over on the "dump table" causing a jam. Removal of containers by applying a vacuum to the container neck or shoulder has also been tried only to discover attendant drawbacks which are mentioned subsequently in this discussion.

Prior art does show various mechanisms for automatic lifting bottles or jars from their shipping case. One such mechanism is shown in Griswold, U.S. Pat. No. 2,628,732. This patent relates to a machine for uncasing bottles and jars which includes a horizontal conveying means for transporting cartons, each packed with inverted, openmouth containers, i.e., glass jars, and for bringing the cartons in succession to the uncasing station at which each carton is arrested. A single platen carrying a battery of suction cups is pivotally attached to a platen carriage to swing about a horizontal axis for inverting and reinverting the platen. The carriage is mounted for up and down movement and when lowered brings the suction cups into contact with the bottom ends of the inverted jars. Suction is then applied to attach the jars to the platen and the platen carriage is lifted to withdraw the jars from the carton. Thereafter the platen is inverted to swing said jars to an upright position. A pusher bar is then advanced horizontally over the platen, thereby pushing the jars off the platen on to a platform or other receiving means. This mechanism would lose positive control of tall, light weight containers as soon as the vacuum is released and the pusher bar scrapes the containers off the platen, thereby providing relatively unstable containers which could tip and jam the mechanism.

Another carton uncaser is shown in Stiles, U.S. Pat. No. 2,862,633 which relates to an uncaser employing automatic flap opening means and wherein a conveyor moves the carton containing upright containers to a carton emptying station at which it contacts a micro switch, causing a number of operations to occur. A vacuum lifting head is lowered to the open carton and engages the container units by means of a plurality of suction cups. Thereafter the head is raised and then rotated about a vertical axis through a horizontal angle of 90° to a position at which the container units are disposed over an unloading platform in an upright position. Thereafter the container units are released from the vacuum lifting head and pushed to a moving discharge belt by a vacuum operated discharge device. This mechanism has the drawback associated with the Griswold mechanism, and in addition, it operates on the open end of the containers which is very disadvantageous. Some disadvantages of gripping a container for uncasing by its mouth, neck or shoulder — or any combination of these surfaces — are (1) the containers can collapse when a vacuum is applied if they have thin flexible walls. Also, stress cracks may be caused in plastic walls even though the walls spring back after the vacuum is released. (2) Container scratching can be caused at the neck or the top of the container where marks are most noticeable and undesirable. (3) Case orientation during infeed must be known and controlled when handling off-center necks before a neck gripper device will work reliably if the uncasing device locates from the case position. (4) Container necks and shoulders generally are more intricate than a container bottom and thus more difficult to subject to a vacuum. (5) Contamination can occur in several ways. Some uncasers insert fingers, which are expanded after insertion, into the mouth of the container. These fingers can carry foreign material which will contaminate the container. An uncasing gripper which overlies the container can drop contaminate into the containers. By gripping on the top of the container, the mouth is covered, and the container is probably in an upright position and either condition by itself will prevent any foreign matter from dropping out of the container.

Mechanisms incorparating a plurality of sets of suction heads are also known as is shown in Goldsborough, U.S. Pat. No. 3,275,189. This patent describes a tray feeding apparatus wherein sets of suction heads are uniformly arcuately spaced about a horizontal axis. The sets of suction heads sequentially removed trays from a magazine and rotate to deliver the same to a tray receiving conveyor. The suction heads are mounted for arcuate movement in order to withdraw the trays from the magazine.

In previous devices, single lining has been achieved by placing empty containers on a "dump table" and single lining them from there by various means, one of which is shown by McClelland, U.S. Pat. No. 3,262,542. This patent shows a bottle unscrambler using a pair of spaced divider members to move the successive rows of bottles to a position aligned with the discharge conveyor of the machine which operates perpendicular to the travel of the incoming bottles. A row of bottles aligned with the discharge conveyor is placed on the conveyor by pushing them with an air operated ram. But this does not provide positive control of individual containers from the time they come from the case until they are single lined. The 90° transfer is particularly problematic when dealing with oblong containers.

Uncasing of empty containers from reshipper cartons has been accomplished in several ways depending upon the types of containers being uncased. Heavy containers, e.g., glass bottles, have been both lifted out of the carton by vacuum pick-up and dropped out of inverted cartons relying on the weight of the container to overcome the frictional force between the container and the container dividers within the case. Light weight, flexible containers, e.g., plastic bottles, cause different problems in that suction applied to the open end of the bottle will tend to collapse the bottle thereby weakening the bottle at the point where it flexed, possibly delivering a collapsed bottle. Also, light weight bottles are not heavy enough to overcome the friction between the container dividers within a case and the light weight container. Therefore light weight containers do not always drop out of an inverted carton. Light weight containers can be vibrated out of inverted cartons, but when they are, other problems usually accompany the vibration, i.e., carton dust and dirt from the carton falls into the open mouth of the container thereby causing a sanitation problem and the motion imparted to the container by the vibration creates an unstable container which can tip over quite easily and jam a container unscrambler. Also the prior art use of a single set of vacuum pack-ups to uncase containers severely limits the speed at which uncasing can be performed.

OBJECTS OF THE INVENTION

Accordingly, it is an object of this invention to provide an uncaser-single liner mechanism employing maximum control of containers as they are uncased, thereby giving them stability as they are moved.

A further object of this invention is to provide a simple, single liner mechanism which maintains positive control of the uncased containers from the time the uncaser releases said containers until the containers are moved onto a single line discharge conveyor and which is operatively associated with the uncaser.

Another object of this invention is to provide a simple mechanism for extracting inverted containers from the cells of a reshipper case and depositing said containers at another station in an upright position, thereby minimizing contamination of the container via its open mouth.

Another object of this invention is to uncase and single line containers at high speeds by unloading an entire case per machine cycle and by providing design flexibility to permit operating several uncasers in tandem.

A related object of this invention is to grip light weight, flexible containers for handling operations without marking or collapsing said containers.

SUMMARY OF INVENTION

In accordance with one aspect of the present invention a conveyor positions a layer of empty inverted containers in an unloading station underlying one of a plurality of sets of suction grip heads. The sets of suction grip heads are rotatably mounted and the mount can be moved vertically. Each set of suction grip heads contain a suction grip head for each container in the layer and the sets of suction grip heads are adapted to pass through a deposit station, which is laterally displaced from the unloading station, when they are rotated and displaced vertically. The deposit station is overlayed by a container divider adapted to be moved across the deposit station and having parallel plates which have clearance for the passage therethrough of the sets of suction grip heads.

In accordance with another aspect of the present invention, a method is provided to transfer and invert single layer patterns of inverted containers from one station to another by gripping the uppermost surface of each container in the pattern, lifting the containers to clear any lateral obstacles, simultaneously turning upright and laterally moving the containers to a deposit station laterally displaced from the point of pickup, releasing the containers in an upright position and in their original pattern upon the deposit station, and removing the containers from the deposit station in a single file.

BRIEF DESCRIPTION OF THE DRAWINGS

Other objects and advantages of the invention will become apparent upon reading the following detailed description and upon reference to the drawings, in which:

FIGS. 3 through 10 are simplified side views of an uncaser-single liner of the present invention showing the sequential operation of said mechanism with containers arranged in two rows in the case, wherein FIG. 3 shows a full case in position at the unloading station, and a group of containers held by one set of suction grip heads above the deposit station.

FIG. 4 shows the unloading device part way along its vertical descent.

FIG. 5 shows the containers positioned and released within the container divider and upon the deposit station.

FIG. 6 shows the first row of containers single lined onto the container removal conveyor and the other set of suction grip heads in contact with the bottoms of the containers in the case positioned at the unloading station.

FIG. 7 shows the inverted containers pulled from the case at the unloading station.

FIG. 8 shows the second row of containers on the deposit station single lined and the case at the unloading station discharged while the next set of containers are started on their arcuate path to the deposit station.

FIG. 9 shows one position of the containers in their arcuate travel which turns them upright.

FIG. 10 shows the container divider returned across the deposit station to receive containers from the unloading device and the next case in position at the unloading device.

DETAILED DESCRIPTION OF THE INVENTION

Figure 1:
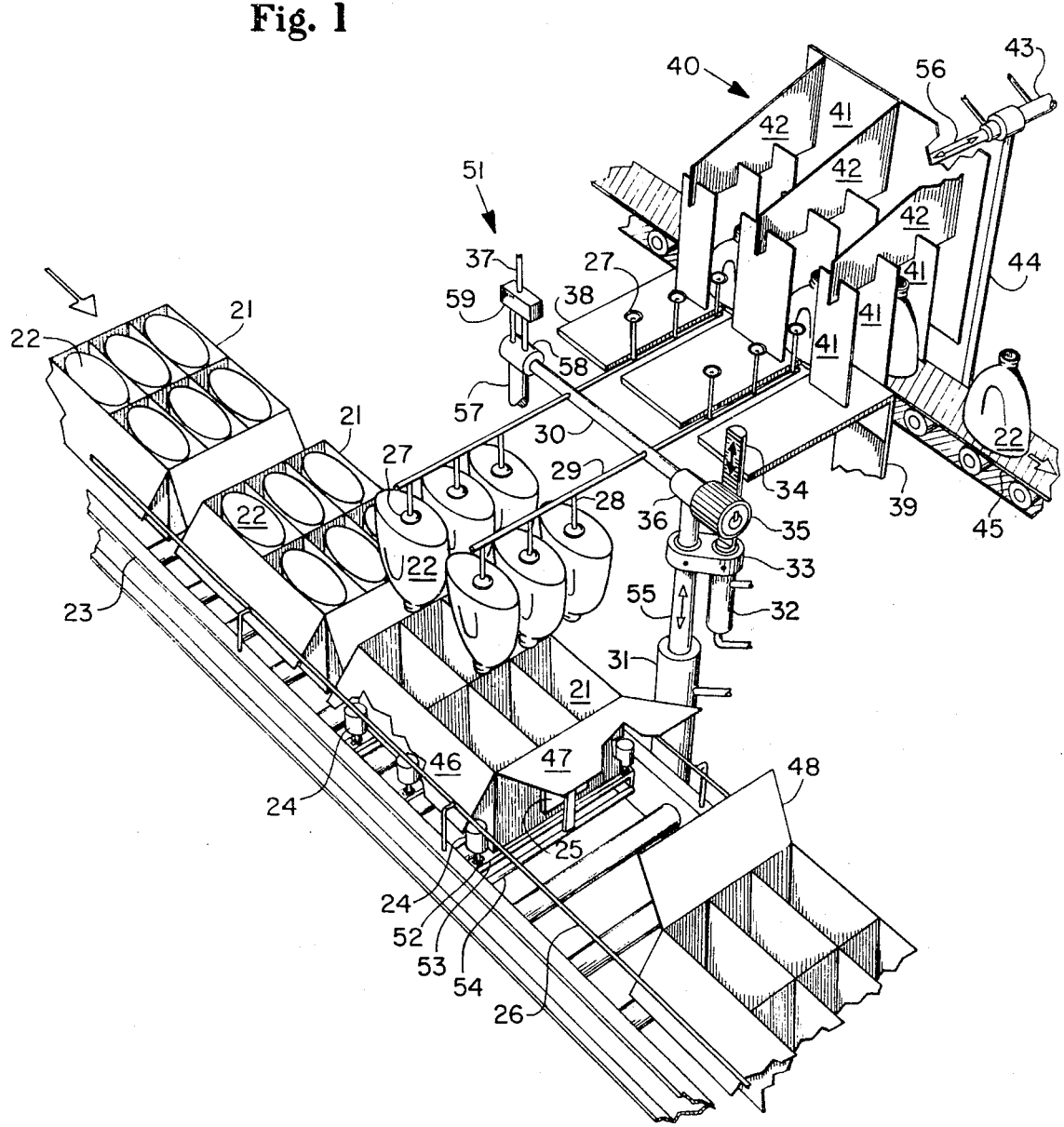
FIG. 1 is a fragmentary perspective view of the uncaser-single liner mechanism, with structural features simplified for purposes of clarity.

Turning first to FIG. 1, there is shown the automatic uncaser-single lining mechanism of the present invention. The drawing has been simplified for clarity by omitting structural aspects, e.g. machine frames, since these do not constitute a part of the invention and are details which can be readily supplied by designers of ordinary skill. An unloading station is defined on the case conveyor 23, a powered roller conveyor which is constantly running, by the case stop 25 and the freely, rotatably mounted, lateral case rollers 24. The drive mechanism of the powered roller conveyor 23, which normally is a constantly running belt, subjacent to aand in contact with the rollers of the conveyor, has been omitted from the drawings for simplicity and clarity in showing other parts of the mechanism. The case stop 25 is a physical obstacle inserted in the path of a case to catch the forward edge of a case 21 as it is moving along the case conveyor 23. The case stop 25 as shown in this embodiment is a rectangular plate affixed to support rod 54 which is rotatably mounted on the conveyor side rails. The angular position of the stop support rod 54 and the case stop 25 can be controlled by any of several mechanisms, e.g., a drag linkage or a rack and pinion, operating on the stop support rod 54 actuated by suitable control means at the appropriate points in the machine cycle, in a manner readily apparent to designers of ordinary skill in the art.

The case stop 25 can alternatively be constructed as (1) a plate attached to a double acting hydraulic or pneumatic cylinder attached to the framework of conveyor 23, or (2) as a plate pivotally mounted on the conveyor and rotated upon command by a mechanical actuation such as a cam or a double acting cylinder. The mechanical actuation for the case stop 25 can be interconnected with the operating rod 55 of the vertical uncasing cylinder 31, if desired, so that the case stop 25 protrudes above or retracts below the rollers of conveyor 23 in relation to the position of the operating rod 55.

The lateral case rollers 24 are supported by lateral roller supports 52 which extend to underlying carrier bars 53. Carrier bars 53 are supported from the framework of the case conveyor 23 and can be positioned fore and aft along the direction of travel of the case conveyor 23. The carrier bars 53 contain slots therethrough for mounting the lateral roller supports 52 and providing lateral adjustment of the lateral case rollers 24. The lateral case rollers 24 are ball bearing rollers mounted on the end of the lateral roller support 52 and are spaced to provide passage of a case down the conveyor 23 with minimum clearance between the case 21 and the opposing rollers 24. Or the lateral case rollers 24 can contact the case 21 on both sides as case 21 moves between the rollers 24 to exert an inwardly directed force on the case 21 which will clamp the cell dividers in the case while the containers 22 are removed.

The case conveyor 23 is provided with flap rails 26. The flap rails 26 are shown fixed in this embodiment, but they also can be made adjustable to allow for different size cases or different operating conditions. The flap rails 26 are bars which extend along the length of the conveyor 23 and are supported at an elevation high enough to engage the opened side flaps 46 of a case 21. The flap rails 26 function so as to maintain the side flaps 46 of the case 21 in an open position.

The unloading device 51 comprises a plurality of sets of suction grip heads 27, two sets being shown in the illustrated embodiment, and a network of structural members containing separate passageways which allow each set of suction grip heads 27 to communicate independently with the vacuum source 37. The suction grip heads 27 are arranged in sets, each of which corresponds in pattern to that formed by containers 22 within a case 21 awaiting unloading. The suction grip heads 27 are similar to the familiar suction cup and can be made from any of numerous materials which are highly flexible and resilient so as to deform to minor irregularities in the surface to which they are to attach, in this case the bottom surface of the container. The suction grip heads 27 each have a passageway therethrough, providing communication between the central portion of its concave, container-contacting face and the interior of the arm extension 28 on which the grip head 27 is mounted.

The arm extensions 28 are tubular and as indicated, have the suction grip heads 27 mounted thereon. preferably by pressing the extensions 28 within the grip head passageways so that a tight friction fit is obtained. The arm extensions 28 preferably have a slight degree of flexibility to allow the suction grip heads 27 to more readily conform to a sloping surface. Thus, the arm extensions 28 will flex when subjected to a moment transmitted through the suction grip heads 27 if the suction grip heads 27 are located upon an incline. If the arm extensions 28 are not somewhat flexible, all of the variance between the plane of the suction grip heads and the plane of the container 22 bottom must be taken up by the suction grip heads 27 themselves. If this variance exceeds the operational deflection limits of the suction grip heads 27, the suction grip head 27 will fail to make a gripping connection. Flexibility in the arm extensions 28 also allows spreading of the container pattern as the containers are pulled into the container divider 40.

Figure 2:
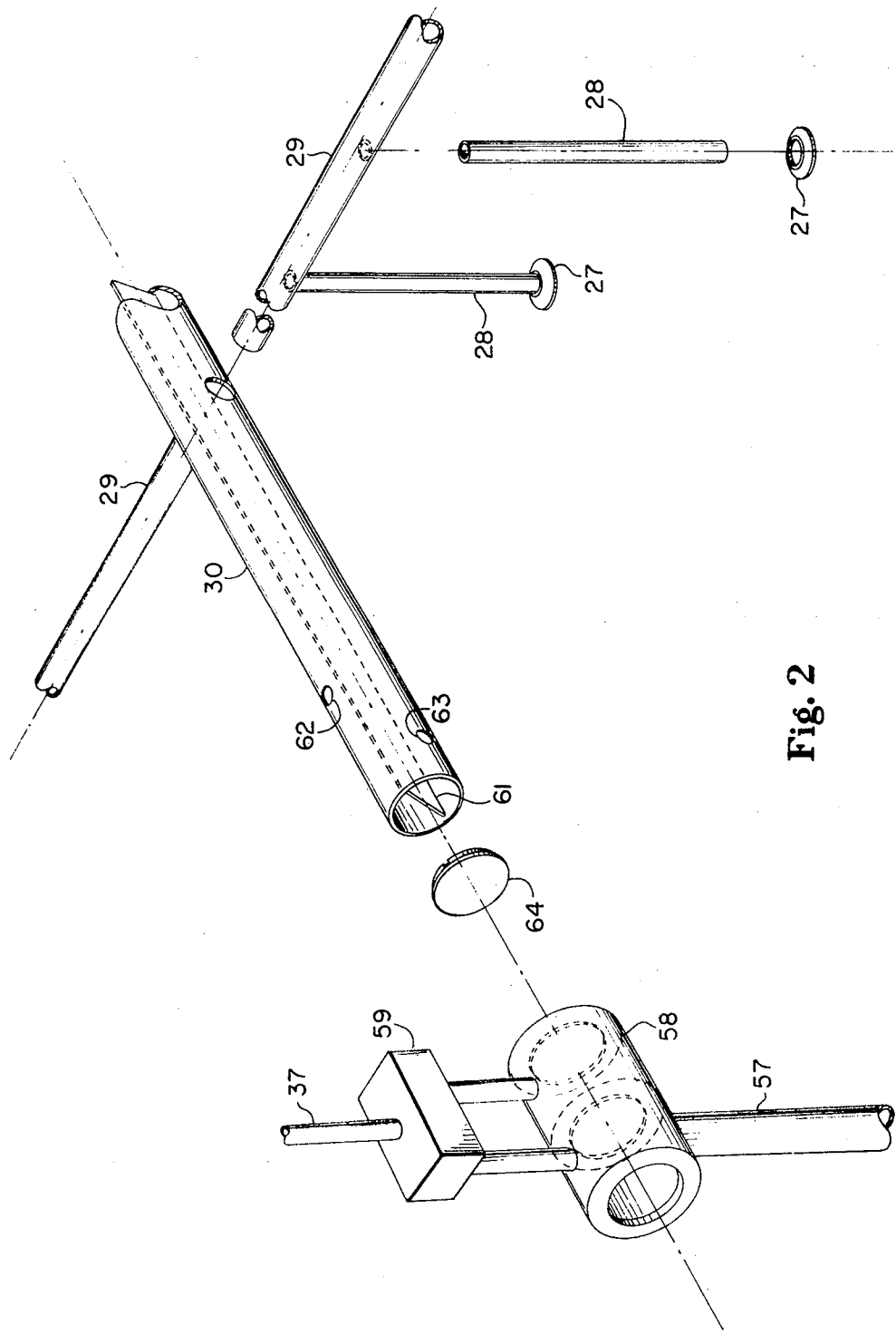
FIG. 2 is a fragmentary, exploded perspective view of the rotatable unloading device and one of its supports.

The tubular arm extensions 28 are in turn connected to the arms 29 which are rigid tubular members connected at one end to the center tube 30 and closed at the other end. In FIG. 2 it can be seen that they have an orifice at each connection with an arm extension 28 to allow communication between the passageway in arm 29 and the passageway in arm extension 28.

The center tube 30 is also a rigid tubular member having its ends closed by end caps 64 and having a longitudinal dividing member, as shown by the center tube divider 61 in FIG. 2, extending the length of its bore to form distinct passageways within the center tube 30, the passageways running the length of the tube.

The arms 29 associated with separate sets of suction grip heads 27 are ported to separate passageways within center tube 30 to provide a distinct passageway within the center tube 30 for each set of suction grip heads 27. The center tube 30 runs through and is supported by the center tube supports 36 and 58.

Thus it is shown that the rotatable unloading device 51 has a plurality of these sets of suction grip heads 27, and each set is connected to the center tube 30 by its own network of arms 29 and arm extensions 28 and each set can independently be connected or disconnected with the vacuum source 37.

The unloading device 51 can be selectively moved both vertically and rotationally. It is supported for vertical reciprocation by the uncasing cylinder 31 and its operating rod 55 on one side and by the supporting member 57 on the other side. The supporting member 57 can, if desired, be supported by and thus move in conjunction with the operating rod 55 of the vertical uncasing cylinder 31 or, alternatively, freely telescope in an underlying vertically oriented sleeve or guide (not shown). The vertical uncasing cylinder 31 can be attached to a base which rests on the floor or can be attached to a pedestal to give it any needed height. It can be either a pneumatic or hydraulic cylinder which is connected to the appropriate energy source, i.e., pneumatic or hydraulic, and is actuated by suitable control means at appropriate points in the machine cycle in a manner readily apparent to designers of ordinary skill in the art.

The rotatable unloading device 51 is supported for rotational movement by the right hand center tube support 36, which is attached to the top of the vertical uncasing cylinder operating rod 55, and the left hand center tube support 58, which is attached to the top of supporting member 57. The center tube supports 36 and 58 provide bushings for rotation of the rotatable unloading device 51.

The center tube supports 36 and 58 can serve a dual function of supporting the rotatable unloading device 51 and separating the vacuum inputs to each passageway within the center tube 30. Such a separating device provides a distinct and separate passageway to each set of suction grip heads. Thus the vacuum source 37 for each set of suction grip heads can be controlled independently.

The passageway separation provided by either center tube support is accomplished by forming non-communicating lateral compartments within a center tube support, e.g., left hand center tube support 58, as is shown in FIG. 2, so that the center tube support has several distinct annular chambers around the center tube 30. Each passageway within the center tube 30 is ported to a different annular chamber by openings 62 and 63 in center tube 30, which are aligned with the appropriate annular chamber, and each annular chamber has a separate connection to the vacuum source. Of course there are appropriate seals between the center tube support and the center tube itself to provide the distinct channeling of vacuum to each set of suction grip heads.

A switching control, shown at 59, selectively connects the vacuum source 37 to each set of suction grip heads while that set of suction grip heads is in a certain phase of the cycle of uncasing operation. That phase should extend from the time the suction grip heads 27 contact the container 22 bottom within the case 21, to the time the containers 22 are deposited upon the deposit station 38. This switching control can be valve controlled by feedback from other moving parts in the uncaser-single liner, e.g., the position of the operating rod 55 of the vertical uncasing cylinder 31, or in the alternative, a valve actuated in accordance with a predetermined timing.

A unidirectional rotation means for the unloading device 51 can be provided by a rack and pinion which has an overriding clutch incorporated therein. The center tube 30 extends through and beyond the center tube support 36, see FIG. 1, in order that a rotational force can be applied to it. The rotational force is provided by a rack and pinion with the pinion 35 operatively associated with the center tube 30 via an overrunning clutch (not shown), as is well known to those of ordinary skill in the power transmission arts, and the rack 34 moved by a double acting cylinder 32. The overrunning clutch can be a pawl and ratchet adapted to permit correlative motion of the pinion 25 and the center tube 30 as the pinion 35 rotates in one direction but no motion of the center tube 30 as the pinion 35 rotates in the other direction and it can be placed either axially or radially between the pinion 35 and the center tube 30. The rotatable unloading device 51 is driven by the pinion 35 which is driven by rack 34 which is connected to the operating rod of the container inverting cylinder 32. The container inverting cylinder 32 is supported by the operating rod 55 of the vertical uncasing cylinder 31 by means of the container inverting cylinder support member 33. The container inverting cylinder 32 is preferably an air operated cylinder, but could by hydraulic if the acceleration or smoothness of operation desired requires it. A detent arrangement (not shown) between the center tube 30 and the center tube support 36 can be used to maintain the angular position of the rotatable unloading device 51 as the overrunning clutch allows the rack to return to its original position without rotating the unloading device 51. This detent could be a radially inwardly directed, spring loaded ball in the center tube support 36 and a series of indentations properly spaced on the circumference of center tube 30 wherein the indentations are aligned with the ball so the ball can seat in the indentations to hold the unloading device 51 in position as the rack 34 returns to its oritinal position.

The deposit station 38 is a platform having a front and back portion. The containers 22 are deposited by the rotatable uncasing device 51 on the front portion which has slots therein to permit the passage therethrough of arms 29, arm extensions 28, and suction grip heads 27 associated with each set of suction grip heads. The containers are supported by the deposit station 38 during the single lining operation while they await their turn to be placed on the container conveyor 45. The deposit station is supported by the deposit station support 39 which can extend to a pedestal resting upon the floor. The slots within the deposit station must be narrow enough to prevent the containers 22 from falling through. The slot width thus is dependent upon both the suction grip head 27 diameter and the container 22 bottom dimensions.

The single lining mechanism has a container divider 40, a single liner, multi position cylinder 43, and a container conveyor 45. The container divider 40 has parallel plates 41 which are supported and separated by parallel plate spacers 42. The parallel plates 41 are thus arranged as shown in FIG. 1 to form a plurality of container row dividers, the number of which should be one greater than the number or rows of containers 22 in the cases. The space between adjacent parallel plates 41 comprising such row dividers must be slightly greater than the thickness of the container and must have an unobstructed height at least equal to the height of the containers 22 to be single lined to permit the free passage therethrough of containers 22. Thus the parallel plate spacers 42 can be attached to the parallel plates 41 near the top of said parallel plates to provide the required clearance, or as an alternative the parallel plates spacers 42 could be contoured to allow the passage thereunder of containers 22.

Each of the parallel plates 41 which overlie the slots in deposit station 38 at any time during cycling of the mechanism are formed of several plates lying in one plane, but separated as shown in FIG. 1 to allow the passage therethrough of the suction grip heads 27, arm extensions 28, and arms 29. Clearance for those elements of the rotatable unloading device must be provided to accommodate the rotatable unloading device 51 when the container divider is positioned over the front portion of the deposit station. Such separation of the parallel plates allows passage therethrough of the element of the rotatable unloading device 51 and will suffice to provide the required clearance so the angular path of the rotatable unloading device is clear at all times. Such separation of the parallel plates cannot be as large as the dimension of the container parallel to the parallel plates 41 because the parallel plates 41 are used to push the containers 22 across the surface of the deposit station 38.

The container divider 40 is connected to the operating rod 56 of the single liner, multiposition cylinder 43. This cylinder 43 is supported by a support 44 which can extend to a floor stand or be integrally connected with the support 39 for deposit station 38.

A container conveyor 45, which can be a powered belt conveyor, is located adjacent to an edge of the deposit station. It is adjacent the deposit station edge over which the single liner cylinder 43 moves the container divider 40 and is supported by any means well known to those of ordinary skill in the conveyor art. The height of the container conveyor can be from approximately the same as that of the deposit station 38 to slightly below that of the deposit station 38 so as to provide smooth transition from the surface of the deposit station 38 to the moving surface of the container conveyor 45. The containers 22, if oblong, should be oriented on conveyor 45 to have their length axis parallel to the direction of travel of the conveyor for maximum stability during acceleration.

In operation, a continuous supply of cases 21 full of empty containers awaiting unloading are moved toward the unloading station by the case conveyor 23. The case side flaps 46, front flap 47, and back flap 48 can be folded open either manually or automatically. The side flaps 46 are held open by the flap rails 26 attached to the case conveyor 23. The front and back flaps 47 and 48 are held open by pressure from the adjacent cases. The front flap 47 of the case at the unloading station can be held open if necessary by the case stop 25 or other mechanical means associated with the case conveyor 23.

The automatic control of all sequential operations of the uncaser-single liner can be performed by pneumatic logic devices which are well known to those of ordinary skill in the automatic control arts. The pneumatic logic devices can be set up so that both the power and the control components are operated from one air supply. The only electric device required would be the vacuum pump motor. Pneumatic limit switches and timers would be utilized to sequence all movements produced by air cylinders. Pneumatic control of hydraulic power cylinders is also common practice.

Figure 3:
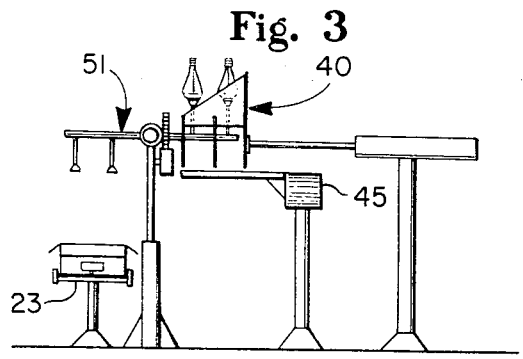

A full case 21 is laterally positioned in the unloading station by passing between the lateral case rollers 24 and is positioned fore and aft by indexing against protruding case stop 25. The case 21 is maintained in the unloading station by the force exerted by the continuously running case conveyor 23. The position of the rotatable unloading device and the container divider at this stage are shown in FIG. 3, in which the bottles in case 21 are in two rows rather than the three rows shown in FIG. 1.

Figure 4:
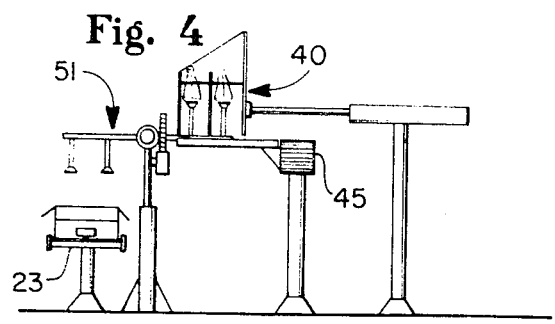

With the case 21 positioned in the unloading station, the number 1 set of suction grip heads, i.e., that set of suction grip heads overlying the unloading station, is lower by the vertical uncasing cylinder 31. Simultaneously, the containers being held by vacuum applied to the number 2 set of grip heads, i.e., the set of suction grip heads operating at the deposit station 38, are lowered into the container divider 40 which has been extended across the deposit station 38 by the single liner cylinder 43 to line up with the container pattern held by the number 2 set of vacuum grip heads over the front portion of the deposit station 38. This stage of the machine cycle is shown in FIG. 4.

Figure 5:
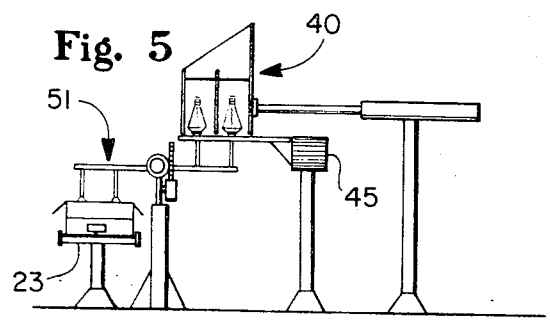

The arms 29, arm extensions 28, and suction grip heads 27 pass through the space separating the forward parallel plates 41 and through the slots in station 38 as the vertical uncasing cylinder 31 continues to lower the rotatable unloading device 51. The vacuum connection to the number 2 set of vacuum grip heads is terminated as the container bases contact the front portion of deposit station 38, releasing the previously uncased containers within the container divider 40. This stage of the machine operation is shown in FIG. 5.

Figure 6:
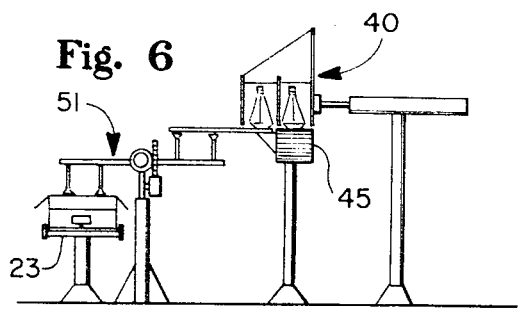

When the number 1 set of suction grip heads, i.e., that set overlying the unloading station in FIG. 6, makes contact with the containers 22 in the case 21, vacuum can be applied to that set of suction grip heads to make a connection between the containers and the number 1 set of suction grip heads.

Meanwhile, the single liner cylinder 43 moves the container divider 40 toward the back portion of the deposit station 38 and to a first position whereat the first row of containers to be single lined overlies and rests upon the container conveyor 45. The first row of containers is carried from between the first set of parallel plates 41, out of the container divider 40 and down the container conveyor 45 to the next station. The parallel plates 41 of the container divider 40 hold the containers 22 upright as they are moved across the deposit station and onto the container conveyor.

As an adjunct to the invention, the machine can be designed and controlled so if any single suction grip head does not attach to a container bottom, the vacuum system will detect this condition. If such occurs the vertical uncasing cylinder 31 can be signaled to raise the rotatable unloading device 51, which includes the number 1 set of suction grip heads, reject the entire case positioned in the unloading station, and index the next full case 50. The next case is then tried for contact between each suction grip head in the set of suction grip heads and a container 22 bottom. If contact with all suction grip heads is achieved, the unloading sequence can be continued.

The controls can also be set up so that upon any suction grip head 27 not attaching to a container bottom, the number 1 set of suction grip heads will attach to those containers 22 in attachment contact with a suction grip head and the uncaser will continue with the normal sequence of operations while leaving behind those containers 22 which the suction grip heads 27 cannot attach to. In either case when a suction grip head 27 does not successfully attach to a container 22, a deviation in the handling of emptied cases would be instigated, i.e., any case in the unloading station when a suction grip head is not able to attach to a container bottom during the unloading stage will be ejected from the case conveyor. The reject mechanism could be any of those well known to men of ordinary skill in the material handling art, e.g., a side ram triggered as the object case passes the ram so as to knock the object case off the mainline of the conveyor 23, or a movable conveyor section which routes the object case to a holding station.

Figure 7:
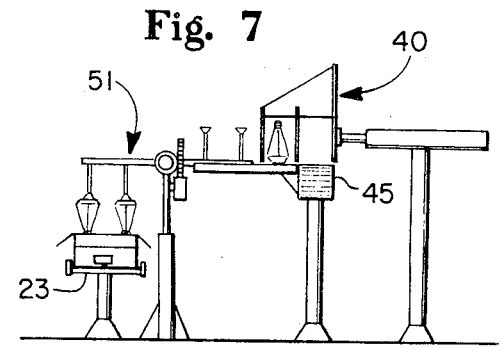
Figure 8:
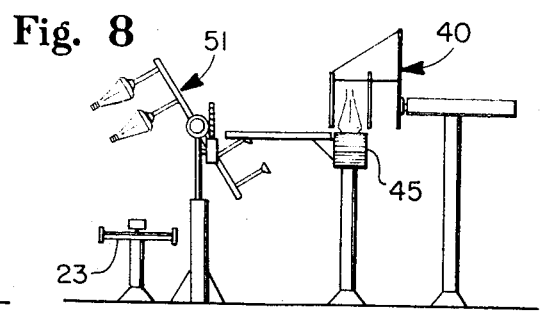

As soon as one row of containers is carried out of the container divider, which can be established by various devices, such as a photoelectric cell setup or a pneumatic timer, the single liner cylinder moves to position 2 whereby the next row of containers is pulled onto the container conveyor so they may be withdrawn from between the next pair of parallel plates 41 of the container divider 40. If the cases 21 contain more than two rows, single lining positioning by the single liner cylinder 43 continues until all rows of containers in the container divider 40 have been single lined. Single lining stages of operation are shown in FIGS. 6 through 8.

If a short cycle time is desirable, the back portion of the deposit station 38 can be made large enough so that a complete pattern of containers can rest thereon as soon as single lining has begun. Incorporating that aspect insures that no containers overlie the front portion which contains the relief slots for the rotatable unloading device and thus the unloading sequence can continue without causing grip heads 27 to lift containers 22 from station 38.

Then, after single lining has begun and independent of the single lining operation, the vertical uncasing cylinder 31 moves the unloading device 51 upwards to lift the containers 22 from the case 21 positioned in the unloading station. This stage is shown in FIG. 7.

When the vertical uncasing cylinder 31 has moved the rotatable unloading device 51 high enough so the containers 22 attached to number 1 set of suction grip heads clears the case 21, the case stop 25 retracts thereby discharging the emptied case 21. The case stop 25 rises from between the case conveyor rollers just before the trail end of the discharged case 21 passes over it so that it is in position to stop the next full case 21 as the discharged case 21 is pushed off the now protruding case stop 25.

Figure 9:
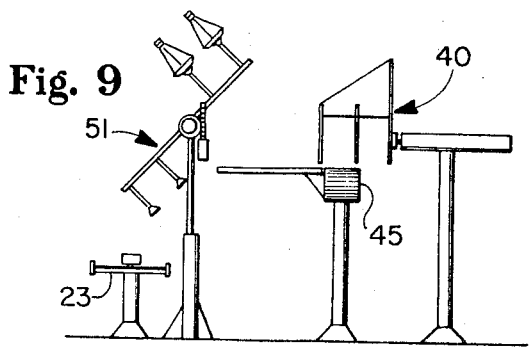

When the vertical uncasing cylinder 31 has raised the unloading device 51 far enough so that all obstacles to rotational movement of the containers 22 are cleared, rotation of the rotatable unloading device 51 begins. The container inverting cylinder 32 is actuated, which draws the rack 34 downward across the pinion 35. The pinion 35 and the center tube 30 are in locked engagement when the pinion rotates clockwise, as seen in FIG. 1, thereby causing rotation of the rotatable unloading device 51. At the end of the stroke of the operating rod of container inverting cylinder 32, a detent between the center tube support 36 and the center tube 30 holds the rotatable unloading device at the position it is in at the end of the travel of the rack, while the overrunning clutch between the pinion 35 and the center tube 30 allows the pinion 35 to run backwards while the rack 34 and the operating rod of the container inverting cylinder 32 return to their original position. Two stages of the rotation are shown in FIGS. 8 and 9.

Inversion of the containers 22 held by number 1 set of suction grip heads is completed at the top of the vertical uncasing cylinder's stroke. The top of the vertical uncasing cylinder 31 stroke is high enough to avoid interference with the container divider 40 when it is returned for the next single lining cycle.

Figure 10:
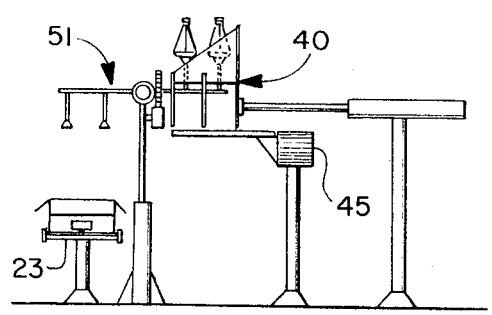

As soon as the single liner, multi-position cylinder 43 returns the container divider 40 to the front part of the deposit station 38, i.e., under the pattern of containers held by the number 1 set of suction grip heads, the vertical uncasing cylinder 31 can again lower the rotatable unloading device 51 to deposit containers 22 within the container divider 40 and upon the deposit station 38. That is the beginning of the next phase of the uncasing single lining mechanism as is shown in FIGS. 10 and 3.

A large number of container patterns within cases can be handled by merely changing the patterns of the sets of suction grip heads 27 and the arrangement of the parallel plates 41 and slots in deposit station 38. Variations in container height are accommodated by changing the stroke of uncasing cylinder 31. Many different operations can be performed once the containers are removed from the case 21. It is also feasible to pull the case 21 from the containers once the containers are held by the suction grip heads without losing the positive control over containers in motion which is attained by this uncaser, single liner mechanism.

Thus it is apparent that there has been provided, in accordance with the invention, an uncaser, single liner that fully satisfies the objects, aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the sprit and broad scope of the appended claims.

What is claimed is:

1. An uncaser comprising:
   A. Conveying means for moving and positioning a plurality of containers at an unloading station;
   B. A 360 degree rotatably mounted unloading device mounted for rotation about a horizontal axis having a set of suction grip heads, said suction grip heads being arranged in a pattern corresponding with the pattern of the plurality of containers, said unloading device operatively associated with said unloading station so that the suction grip heads overlie said unloading station at one position in their rotational path whereby each suction grip head in the set overlying the unloading station is colinear with a container in the unloading station;
   C. Means cooperatively associated with the unloading device for selectively reciprocating the unloading device in a vertical direction;
   D. Means for selectively applying and disconnecting vacuum to the suction grip heads; and
   E. A deposit station laterally spaced from said umloading station for receiving the containers transferred from the unloading station by the unloading device.

2. The uncaser of claim 1 wherein said unloading device comprises a central tube, a tubular arm connected to the central tube and extending outwardly therefrom, and said set of suction grip heads attached to the tubular arm, the axis of rotation of the unloading device being essentially the longitudinal axis of the central tube.

3. The uncaser of claim 1 in combination with a single-liner comprising:
   A. A container divider adapted to receive and separate said rows of containers, said container divider overlying said deposit station and being adapted for reciprocating movement thereacross in directions transverse the orientation of said rows;
   B. Conveying means adapted to receive and convey said rows of containers in a direction aligned therewith; and
   C. Means to move and selectively position said container divider during said reciprocating movement whereby said consecutive rows are indexed to said conveying means.

4. The uncaser-single liner of claim 3 wherein said container divider comprises a plurality of parallel vertical plates spaced to receive said pattern of containers from said suction grip heads and separate said rows of containers within said pattern, said container divider having at least one separation within some said parallel plates, said separation adapted to permit the passage therethrough of the arms of said unloading device, said parallel plates spaced from each other by rigid spacers, and wherein said moving and selectively positioning means has a first position whereat said container divider receives containers from said unloading device and a series of indexing positions whereat said rows of containers are sequentially brought into a container discharge station, and wherein said conveying means for moving rows of containers underlies said container discharge station.

5. The device of claim 2 wherein the unloading device has a plurality of said sets of suction grip heads, the sets being uniformly arcuately spaced about the axis of rotation of the unloading device.

6. An uncaser comprising:
A. Conveying means for positioning a plurality of containers in an unloading station;
B. A rotatably mounted unloading device having a central tube, a tubular arm connected to the central tube and extending outwardly from it, and a set of suction grip heads attached to the tubular arm, the axis of rotation of the unloading device being essentially the longitudinal axis of the central tube, the suction grip heads being arranged in a pattern corresponding with the pattern of the plurality of containers at the unloading station, the unloading device being operatively associated with the unloading station so that the suction grip heads overlie the unloading station at one position in their rotational path, whereby each suction grip head in the set overlying the unloading station is colinear with a container in the unloading station;
C. Means cooperatively associated with the unloading device for selectively reciprocating the unloading device along a path perpendicular to the axis of rotation of the unloading device;
D. Means associated with the suction grip heads for selectively applying and disconnecting vacuum to the suction grip heads;
E. Drive means connected to the unloading device for intermittently rotating the unloading device; and
F. A deposit station spaced from the unloading station and located within the path swept by the suction grip heads during movement of the unloading device, whereby the deposit station intercepts the containers carried by the suction grip heads as the containers are moved from the unloading station, the deposit station having a slot therein adapted to permit the passage therethrough of the tubular arm and the suction grip heads mounted thereon, said slot having a width substantially smaller than the corresponding dimension of the containers carried by the suction grip heads.

7. The uncaser of claim 1 including a unidirectional rotation means operatively associated with the unloading device so that the unloading device rotates in only one direction.

* * * * *

PO-1050
(5/69)

UNITED STATES PATENT OFFICE
CERTIFICATE OF CORRECTION

Patent No. 3,753,509           Dated August 21, 1973

Inventor(s) Ronald W. Kock

It is certified that error appears in the above-identified patent and that said Letters Patent are hereby corrected as shown below:

Column 4, line 55, "aand" should be --and--.

Column 7, line 46, "25" should be --35--.

Column 7, line 59, "by hydraulic" should be --be hydraulic--.

Column 8, line 29, "number or rows" should be --number of rows--.

Column 11, line 18, "trail" should be --tail--.

Signed and sealed this 27th day of November 1973.

(SEAL)
Attest:

EDWARD M.FLETCHER,JR.                RENE D. TEGTMEYER
Attesting Officer                    Acting Commissioner of Patents